3,005,770
PROCESS OF REFORMING NAPHTHAS
Irvin H. Lutz, Texas City, Tex., assignor, by mesne assignments, to Standard Oil Company, Chicago, Ill., a corporation of Indiana
Filed Jan. 25, 1956, Ser. No. 561,216
5 Claims. (Cl. 208—140)

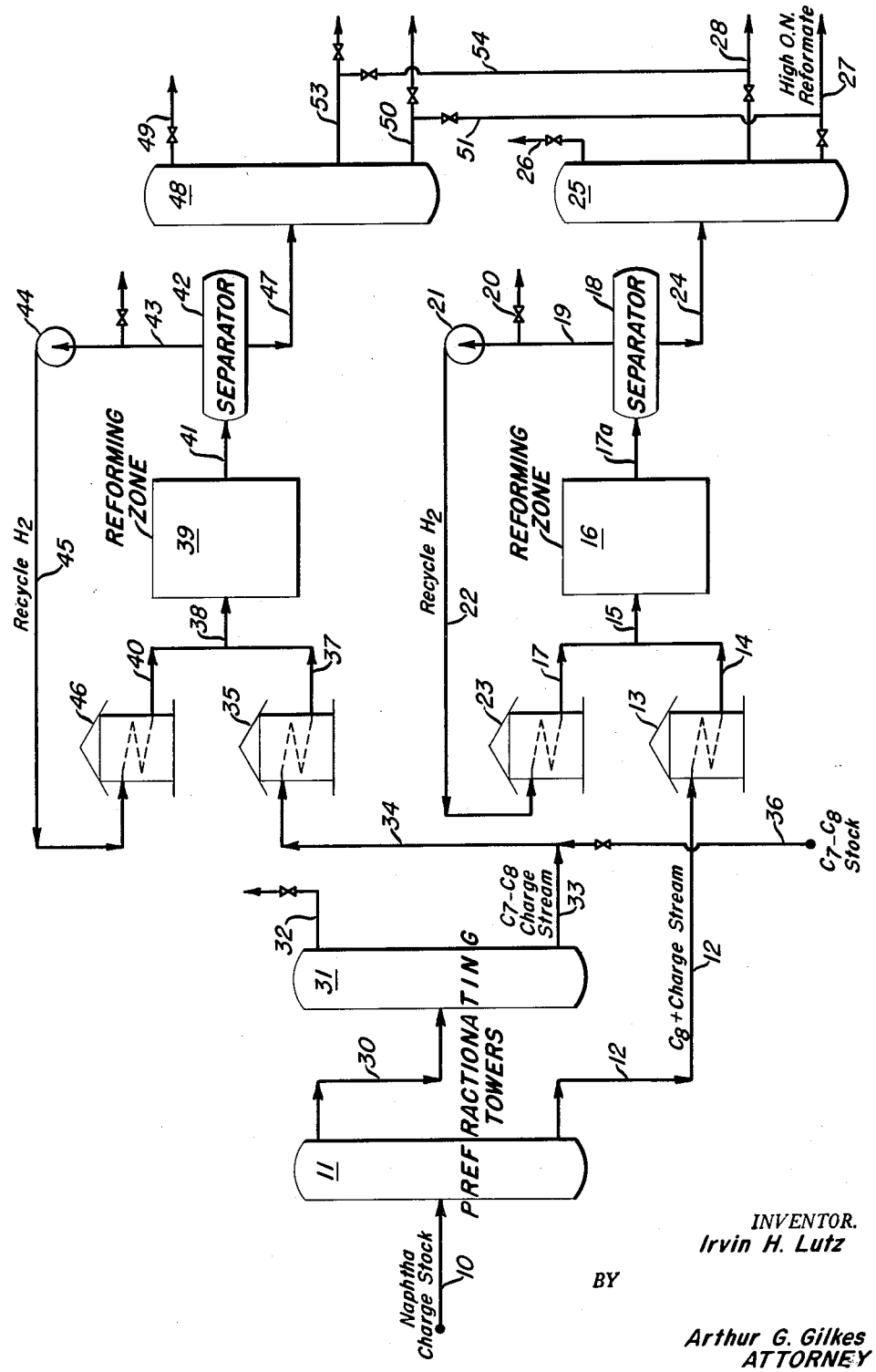

My invention relates to the production of high octane gasoline by selective reforming of naphtha charge stocks. It more particularly relates to a processing system using a platinum type catalyst where two gasolines of different octane levels are required.

The most effective catalyst for hydroforming of hydrocarbons is a catalyst of the platinum type because of its high activity and favorable selectivity in terms of liquid yield of high octane components. The chief problem with the platinum catalyst, however, is maintenance of activity for a satisfactory period of use. Loss of activity is of two kinds: temporary, in which case activity can be restored by oxidative regeneration or by a combination of regeneration and rejuvenation for a new on-stream cycle, and permanent loss of catalyst life, which gradually results from the sequence of repeated reaction and regeneration cycles. Because of the high cost of platinum type catalysts, the life of the catalyst, i.e., its activity maintenance, is an economic factor of controlling importance in competitive evaluation of platinum reforming processes.

Catalyst life is not a fixed property of the catalyst but is a variable influenced to a high degree by the conditions of reforming severity. As severity is increased by increasing temperature, for example, to obtain a higher octane reformate, both the rate of activity decline per cycle and permanent loss of catalyst life are accelerated. Similarly, if pressure is reduced to increase yield at a given octane level, the rate of activity decline is increased, more frequent regeneration is required, and hence rate of permanent loss of activity is accelerated.

The adverse effect of increased severity on process economics is magnified by the fact that the conditions that reduce catalyst life also inherently result in reduced yields of liquid product. My invention is concerned with the problem of rapidly increasing costs as catalytic reforming is adapted to reforming of a wider range of feed stocks and to the production of increasing volumes of very high octane number reformates for use in premium gasolines of current and projected octane specifications. Accordingly, it is an object of the invention to provide a process reducing losses of liquid yields while producing large volumes of high octane reformate (98–100+ CFR—R clear). It is a further object to provide a platinum reforming process obtaining maximum utilization of catalyst values, thereby accomplishing substantial savings in catalyst costs.

According to the invention, the total available charge naphtha for reforming is segregated into a light hydrocarbon stream and a heavy hydrocarbon stream. The light hydrocarbon stream comprises $C_6$ to $C_8$ hydrocarbons, and preferably a $C_7$–$C_8$ cut. The heavy hydrocarbon stream comprises $C_8+$ hydrocarbons. The heavy charge stream is subjected to reforming in the presence of a platinum containing catalyst and recycle hydrogen under relatively severe platinum reforming conditions producing a $C_5+$ reformate of at least about 95 CFR—R octane number clear. The light charge stream is subjected to separate reforming in the presence of a platinum containing catalyst under platinum reforming conditions of moderate severity producing a $C_5+$ reformate of about 88 to 93 CFR—R clear octane number. Advantageously, according to the invention, the catalyst used in the second reforming operation is the catalyst which has been spent in the first reforming operation charging the heavy naphtha. Thus, it has been found that there are substantial incentives for handling $C_7$ and $C_8$ hydrocarbon cuts selectively under moderate conditions and that there are substantial deterrents to exceeding about the 93 level to improve octane.

It is also advantageous, according to the invention, to fractionate the reformates from either or both of the reforming operations to recover a heavy high octane fraction and one or more light lower octane fractions. This is accomplished by splitting the heavy reformate by fractional distillation so as to obtain a bottoms fraction containing greater than 80% aromatics, or by splitting the light reformate by fractional distillation so as to obtain a bottoms fraction containing greater than about 90% aromatics. When both the light and heavy reformates are split, it is advantageous to combine the respective high octane bottoms fractions and the lower octane light fractions for maximum production of blending stocks suitable for premium and regular gasoline.

There are advantages when operations in the two reforming zones are suitably integrated according to the invention, obtained by conducting the reforming of the light charge under lower than conventional pressure. The light charge stream can be selected to obtain a light reformate which is a suitable concentrate for recovery of pure aromatics including benzene, toluene and xylenes. The charge streams can be pretreated separately or before segregation for removal of sulfur and other impurities, or for saturation of olefin content if cracked naphthas are included in the charge, by hydrofining or the like.

The accompanying drawing is a flow plan in diagrammatic form illustrating the general operational procedure of the invention. In the drawing, naphtha charge stock is shown entering prefractionating tower 11 via line 10. In tower 11, the charge is separated by fractional distillation into a light overhead fraction and a heavy bottoms fraction. The cut point in the tower may be varied considerably but advantageously is in the region of about 250° F. to 280° F. so as to provide a charge stream comprising $C_8+$ or $C_9+$ hydrocarbons which is removed through line 12 as bottoms. The heavy naphtha charge stream from line 12 is passed through fired heater 13 and thence via lines 14 and 15 to a reactor inlet in reforming zone 16. The charge naphtha is mixed in transfer line 15, as shown, with recycle hydrogen from line 17.

The reactor system in reforming zone 16 may be one of the conventional types, advantageously comprising a series of reactor vessels, each containing a bed of platinum containing catalyst in pelleted, extruded, or pilled form. Reheating between reactors is provided to compensate for temperature drop because of the endothermic nature of the reactions. Advantageously, a swing reactor may be provided together with means for regenerating any one of the reactors while maintaining the entire system continuously on stream, as in the ultraforming system. The process stream from the last reactor is passed, as by connection 17a to a gas separator 18. The gas phase removed from separator 18 through line 19 is predominantly hydrogen with a minor amount of hydrocarbon gases. Excess gas may be vented from the system through valved connection 20; the remainder is recycled by means of a compressor 21, line 22, thence through a heater 23 and line 17 to transfer line 15.

The liquid phase separated in separator 18 is removed through line 24 to fractionator 25. The fractionator may function as a stabilizer, wherein $C_3$'s or $C_4$'s and lighter, are removed overhead as by valved connection 26 and wherein a stabilized $C_5+$ reformate is recovered as bottoms through valved line 27. Alternatively, the fractionator may function in the manner described in my co-pending application S.N. 556,498, filed December 30, 1955, now U.S. Patent No. 2,968,609, issued January 17, 1961, as a reformate splitter. In this case, light hydrocarbon gases are removed via line 26, and the reformate is cut at a point in the range of about 225° to 300° F., resulting in a bottoms fraction containing at least about 80% aromatics which is removed through line 27. The light reformate fraction which is of lower octane is removed as an intermediate cut through valved line 28. In actual practice, it is preferable to use more than one tower to perform the stabilization and splitting functions, and of course these may be performed in either order. Also, it may be desirable to rerun the heavy fraction to remove heavy ends or polymers boiling too high for inclusion in gasoline.

Returning to prefractionating tower 11, a light hydrocarbon stream comprising $C_8-$ hydrocarbons is taken overhead through line 30 to a second prefractionating tower 31. In fractionator 31, pentanes, and usually hexanes also, are removed overhead through valved connection 32. A second reforming charge stream comprising $C_6$ to $C_8$ hydrocarbons is recovered as bottoms through line 33 and is passed by line 34 to heater 35. The light hydrocarbon steam in line 34 can be augmented by a light cut such as a $C_7-C_8$ fraction from an extraneous naphtha source which is supplied through valved connection 36. The heated charge stock is passed by means of transfer lines 37 and 38 to reforming zone 39. Recycle hydrogen is introduced to transfer line 38 by connection 40.

The reaction system in reforming zone 39 may be similar to the system used in reforming zone 16. Ordinarily, less capacity will be required for the unit in zone 39, and because milder severity is applied, the process and regeneration facilities can be smaller and simpler. For example, the invention may use existing facilities for fixed bed hydroforming of the type using molybdenum oxide-alumina catalysts by simple conversion from the molybdena type catalyst to a platinum type catalyst.

The effluent stream from the reaction system of reforming zone 39 is passed by line 41 to gas separator 42. Hydrogen gas is recovered from separator 42 through line 43 for recycle by means of a compressor 44, line 45, and heater 46 to connection 40.

The liquid phase separating in separator 42 is removed by line 47 to fractionator 48. The light reformate produced by the operation in reforming zone 39 may be stabilized by removal of light hydrocarbons overhead from fractionator 48 through line 49. The stabilized reformate may be recovered as a bottoms stream through valved connection 50. Alternatively, the light reformate may be split at a cut point, usually about 275° F., providing a bottoms stream containing more than about 90% aromatics. The resulting 275+° F. is of high octane and is suitable for blending, as indicated by valved connection 51, with the high octane reformate recovered from fractionator 25 through line 27. The lighter, lower octane stream then may be recovered as an intermediate fraction through valved connection 53. This fraction suitably may be blended, as by valved line 54, with the lower octane cut recovered from fractionator 25 through line 28. Again, the fractionating steps preferably will be conducted in more than one tower in large-scale commercial operation.

In illustrative operation, Mid-Continent naphtha charge stock having a boiling range of 100° to 400° F. is fractionated in tower 11 to recover about 21,000 bbls./day of a heavy naphtha boiling in the range of about 275° to 415° F. The cut point can be varied to include more of the $C_8$'s in the bottoms, but it is desirable to avoid taking more than say 10% of the 280° F.+material in the overhead. The overhead is processed in tower 31 to separate $C_6$'s and lighter although it may be desirable, depending upon feed stock availability, to retain the $C_6$ hydrocarbons in the bottoms recovered as the light naphtha charge stream. The light naphtha charge stream boils in the range of about 200 to 275° F. and includes an extraneous $C_7-C_8$ cut from crude distillation which is supplied through line 36 to provide about 8000 bbls./day of charge. Again, depending upon feed stock available, it may prove desirable to run broader or narrower cuts. Thus, assuming ample $C_7$'s and $C_8$'s are available, the heavy stream recovered in tower 11 is a 275° to 400° F. cut, but it may prove desirable to include substantially all of the $C_8$'s in the heavy stream and handle a segregated $C_6-C_7$ or a $C_7$ cut as a light naphtha stream.

The reforming unit in zone 16 is of the ultraforming type and has 6 reactors, including a swing reactor so as to provide 5 on-stream and one fore regeneration continuously. The minimum cycle length is 60 hours so that the average time of catalyst on process between regeneration is 30 hours. The reaction conditions are designed to produce 99 CFR—R octane reformate. The heavy naphtha stream in line 12 is preheated in heater 13 to about 975° to 1000° F. to provide after commingling with recycled and reheated hydrogen gas an average catalyst bed temperature of 930° F. at an average pressure of 300 p.s.i.g. in reforming zone 16. The design space velocity is 1.0 WHSV, and the recycle gas rate is 5000 s.c.f./bbl. The catalyst used is a platinum-alumina catalyst containing 0.6% platinum, and typically has a useful life for producing 99 octane reformate of 32 bbls./pound of catalyst. Charging a Mid-Continent naphtha, the activity decline rate of the catalyst under these conditions is about 3 octane units in 30 hours. Three octanes is equivalent to a change in activity of catalyst of 25 units on the Indiana relative activity scale, and a specification value of 100 is assumed for fresh catalyst. The catalyst activity is calculated as the relative quantity, expressed as a percentage, of an arbitrarily chosen standard catalyst required to produce a $C_5+$ product fraction having the same octane number under the same test conditions as the test catalyst.

From correlations of catalyst activity and octane produced, an average catalyst activity of 55 is required to produce 99 CFR—R clear reformate at an average bed temperature of 930° F. Thus, in order to produce 99 octane average reformate from the unit, the average activity of the regenerated (0 hours on oil) catalyst on a conservative basis must be maintained at a minimum of 80 (55+25), allowing for a decline in activity of approximately 25 units in 30 hours on stream at 390° F. The desired average activity is maintained by adding fresh catalyst to the unit at regular intervals so that the activities in the various reactors at the time of changing catalyst in one reactor are as follows:

| Reactor: | Catalyst activity |
| --- | --- |
| 1 | 100 |
| 2 | 90 |
| 3 | 80 |
| 4 | 70 |
| 5 | 60 |
| Average | 80 |

The 60 activity catalyst to be discarded is now available for use in one of the reactors of reforming zone 39. In the example, the light charge stream to reforming zone 39 comprises 8000 bbls./day of $C_7-C_8$ hydrocarbons. The charge stream is preheated in heater 35 and commingled with hot recycle hydrogen. The hydroforming unit in reforming zone 35 has two reactors equipped for reheating the charge between reactors. The operating conditions in zone 39 are subject to considerable variation, as in the case of zone 16, but ordinarily they should be designed to produce a reformate in the range of about 88 to 93 CFR—R clear. For purposes of illustration, however, the operation in zone 39 is conducted to produce initially a reformate of 94 octane and is continued to an octane of 86 CFR—R. The average bed temperature is 912° F. at 315 p.s.i.g., and the space velocity is 1.0 WHSV. The design recycle gas rate is 3200 s.c.f./bbl. Using the 60 activity catalyst from zone 16 in zone 39, a 60 hour process cycle is employed on the basis of 10 units of activity loss in 30 hours at 912° F. With the 60 hour cycle the average catalyst activity of regenerated catalyst then is approximately 50 which is sufficient to produce reformate of 94 CFR—R octane at 912° F. Permanent loss of catalyst activity is proportional to the number of regenerations. The activity loss per bbl. of catalyst for the 60-hour cycle therefore is 1.25 units, assuming a conservative life of 32 bbls./pound in zone 16. Since the catalyst activity in zone 39 can drop as low as 20 while still producing 86 CFR—R reformate at 912° F., an additional 32 bbls. of charge (60–20/1.25), on a conservative basis, can be processed before the catalyst must be finally discarded. Hence, by application of the invention, the useful catalyst life has been doubled. The example, processing 21,000 bbls./day in zone 16 and only 8000 bbls./day in zone 39, provides ample catalyst flexibility for further advantages. Sufficient discard catalyst from zone 16 is available for use in zone 39 to permit operation in zone 39 at more severe conditions, e.g. at higher thermal severity with refractory feed stocks, or at lower than ordinary pressure in order to obtain increased yields. For example, yield may be increased to the extent of about 4 to 5% by operating at 200 p.s.i.g. although the catalyst life at the lower pressure will be only about ½ that at 300 p.s.i.g.

The reforming conditions can be varied considerably in the usual way to produce reformates from the two reforming zones of the desired quality. In general, temperatures in the range of about 875° to 1000° F., pressures in the range of about 100 to 500 p.s.i.g., space velocities in the range of about 0.1 to 10 WHSV and hydrogen rates in the range of about 1000 to 10,000 s.c.f./bbl. will be used. In selecting the operating conditions, the catalyst activity is taken into account as a variable affecting severity. The activity levels given in the operating example above are typical of one form of commercially available catalyst but are not intended to be definitive. Higher or lower levels of activity are equally applicable provided the reaction conditions, and particularly temperature, are correlated accordingly. The catalyst may be any of the available platinum type reforming catalysts supported on materials such as silica, silica-alumina, halide-promoted alumina, etc. Preferably, alumina containing about 0.1 to 1.0% platinum, or a platinum type metal is used. If a halogen-promoted catalyst is used, the halogen tends to depletion with use. This is consistent with the use of spent catalyst in zone 16 because the halogen functions primarily to promote hydrocracking and it is desirable to minimize hydrocracking, maximizing aromatization, in this zone, particularly.

Considerable latitude, largely depending upon the refinery naphtha balance, exists with respect to the charge to reforming zone 16 where fresh catalyst is used. But using spent catalyst in zone 39, it is desirable to select a feed which is susceptible to optimum conversion under relatively mild reforming conditions as described above. According to the invention, it is particularly advantageous to use a charge comprising $C_7$–$C_8$ hydrocarbons because the loss of yield for these stocks with increasing octane number above about 92 to 93 is such as to make reforming at the 98 to 100 level prohibitively expensive. Moreover, it has been found that a 275° F.+ cut from a 90 octane $C_7$–$C_8$ reformate is essentially pure aromatics (<95% aromatics for either $C_7$ or $C_8$ charge). Increasing the reforming severity results only in a very slight increase in octane while reducing yield substantially. It is preferable, from the standpoint of both yield and catalyst savings, to limit severity and fractionate the reformate, if desired, to recover an aromatics rich concentrate for high octane gasoline blending or for production of pure aromatics. Moreover, as noted above, splitting the reformate in both zones contributes operating economies by permitting further decreases in severity so as to provide additional catalyst cost savings by prolonging catalyst life.

I claim:

1. In the production of high octane gasoline by platinum catalyst reforming wherein catalyst activity is maintained by repeated periodic oxidative regeneration, the process of selective reforming which includes the steps of segregating a light naphtha charge stream comprising $C_7$ to $C_8$ hydrocarbons and a heavy naphtha charge stream comprising $C_8+$ hydrocarbons in the total naphtha charge, subjecting the heavy charge stream to reforming in the presence of a platinum containing catalyst and recycle hydrogen under high severity reforming conditions including a temperature in the range of about 875 to 1,000° F., a pressure in the range of about 100 to 500 p.s.i.g., a space velocity in the range of about 0.1 to 10 WHSV, a hydrogen rate in the range of about 1,000 to 10,000 standard cubic feet per barrel of feed and an average catalyst activity level, maintained by periodic oxidative regeneration, whereby a reformate having an octane number exceeding 95 CFR—R clear is produced, subjecting the light charge stream to a separate reforming operation in the presence of a platinum containing catalyst and recycle hydrogen under less severe reforming conditions within the above-defined ranges producing a reformate of about 88 to 93 CFR—R clear octane number, conducting the second of said reforming operations with catalyst of relatively low activity which is spent for reforming the heavy charge in the high severity operation to the first above specified octane number under the above defined conditions, and fractionating the reformates so produced to obtain stabilized high octane and low octane fractions.

2. The process of claim 1 in which the high severity reforming is conducted at a severity producing a reformate of about 98 to 100 CFR—R clear.

3. In the production of high octane gasoline by platinum catalyst reforming wherein catalyst activity is maintained by repeated periodic oxidative regeneration, the process of selective reforming which includes the steps of segregating a light naphtha charge stream comprising $C_7$ to $C_8$ hydrocarbons and a heavy naphtha charge stream comprising $C_8+$ hydrocarbons in the total naphtha charge, subjecting the heavy charge stream to reforming in the presence of a platinum containing catalyst and recycle hydrogen under high severity reforming conditions including a temperature in the range of about 875 to 1,000° F., a pressure in the range of about 100 to 500 p.s.i.g., a space velocity in the range of about 0.1 to 10 WHSV, a hydrogen rate in the range of about 1,000 to 10,000 standard cubic feet per barrel of feed and an average catalyst activity level, maintained by periodic oxidative regeneration, whereby a reformate having an octane exceeding 95 CFR—R clear is produced, subjecting the light charge stream to a separate reforming operation in the presence of a platinum containing catalyst and recycle hydrogen under less severe reforming conditions within the above-defined ranges producing a reformate of about 88 to 93 CFR—R clear octane number, conducting the second of said reforming operations with catalyst of relatively low activity which is spent for reforming the heavy charge in the high severity operation to the first above specified octane number under the above defined conditions, fractionating the light reformate to obtain a high octane bottoms fraction containing greater than 90% aromatics and a low octane light fraction, fractionating the heavy reformate to obtain a stabilized high octane reformate and blending the first high octane fraction with the second.

4. In the production of high octane gasoline by platinum catalyst reforming wherein catalyst activity is maintained by repeated periodic oxidative regeneration, the process of selective reforming which includes the steps of segregating a light naphtha charge stream comprising $C_7$ to $C_8$ hydrocarbons and a heavy naphtha charge stream comprising $C_8+$ hydrocarbons in the total naphtha charge, subjecting the heavy charge stream to reforming in the presence of a platinum containing catalyst and recycle hydrogen under high severity reforming conditions including a temperature in the range of about 875 to 1,000° F., a pressure in the range of about 100 to 500 p.s.i.g., a space velocity in the range of about 0.1 to 10 WHSV, a hydrogen rate in the range of about 1,000 to 10,000 standard cubic feet per barrel of feed and an average catalyst activity level, maintained by periodic oxidative regeneration, whereby a reformate having an octane number exceeding 95 CFR—R clear is produced, subjecting the light charge stream to a separate reforming operation in the presence of a platinum containing catalyst and recycle hydrogen under less severe reforming conditions within the above-defined ranges producing a reformate of about 88 to 93 CFR—R clear octane number, conducting the second of said reforming operations with catalyst of relatively low activity which is spent for reforming the heavy charge in the high severity operation to the first above specified octane number under the above defined conditions, fractionating the heavy reformate to obtain a high octane heavy fraction containing greater than about 80% aromatics with a lower octane light fraction and blending the lower octane fraction with the light reformate.

5. In the production of high octane gasoline by platinum catalyst reforming wherein catalyst activity is maintained by repeated periodic oxidative regeneration, the process of selective reforming which includes the steps of segregating a light naphtha charge stream comprising $C_7$ to $C_8$ hydrocarbons and a heavy naphtha charge stream comprising $C_8+$ hydrocarbons in the total naphtha charge, subjecting the heavy charge stream to reforming in the presence of a platinum containing catalyst and recycle hydrogen under high severity reforming conditions including a temperature in the range of about 875 to 1,000° F., a pressure in the range of about 100 to 500 p.s.i.g., a space velocity in the range of about 0.1 to 10 WHSV, a hydrogen rate in the range of about 1,000 to 10,000 standard cubic feet per barrel of feed and an average catalyst activity level, maintained by periodic oxidative regeneration, whereby a reformate having an octane number exceeding 95 CFR—R clear is produced, subjecting the light charge stream to a separate reforming operation in the presence of a platinum containing catalyst and recycle hydrogen under less severe reforming conditions within the above-defined ranges producing a reformate of about 88 to 93 CFR—R clear octane number, conducting the second of said reforming operations with catalyst of relatively low activity which is spent for reforming the heavy charge in the high severity operation to the first above specified octane number under the above defined conditions, fractionating the heavy reformate to obtain a high octane heavy fraction containing greater than about 80% aromatics and a lower octane light fraction, fractionating the light reformate to obtain a high octane bottoms fraction containing greater than about 90% aromatics and a lower octane fraction, and combining the respective high octane and low octane number fractions.

References Cited in the file of this patent

UNITED STATES PATENTS

| | | |
|---|---|---|
| 2,653,175 | Davis | Sept. 22, 1953 |
| 2,689,208 | Murray et al. | Sept. 14, 1954 |